(12) United States Patent
Bar-Gadda

(10) Patent No.: US 9,079,772 B2
Bar-Gadda
(45) Date of Patent: Jul. 14, 2015

(54) RADIANT ENERGY DISSOCIATION OF MOLECULAR WATER INTO MOLECULAR HYDROGEN

(75) Inventor: Ronny Bar-Gadda, Palo Alto, CA (US)

(73) Assignee: BAR-GADDA LLC, Palo Alto, CA (US)

(*) Notice: Subject to any disclaimer, the term of this patent is extended or adjusted under 35 U.S.C. 154(b) by 3536 days.

(21) Appl. No.: 10/819,591

(22) Filed: Apr. 6, 2004

(65) Prior Publication Data

US 2005/0029120 A1 Feb. 10, 2005

Related U.S. Application Data

(63) Continuation-in-part of application No. 10/632,708, filed on Aug. 1, 2003, now Pat. No. 7,384,619.

(51) Int. Cl.
| | | |
|---|---|---|
| C07C 1/00 | (2006.01) | |
| C01B 13/00 | (2006.01) | |
| C01B 3/00 | (2006.01) | |
| C07F 1/00 | (2006.01) | |
| C07C 49/00 | (2006.01) | |
| C07C 13/00 | (2006.01) | |
| C07C 1/12 | (2006.01) | |
| C01B 13/02 | (2006.01) | |
| C01B 3/04 | (2006.01) | |
| C01B 21/30 | (2006.01) | |

(52) U.S. Cl.
CPC ............ *C01B 13/0207* (2013.01); *C01B 3/042* (2013.01); *C01B 21/30* (2013.01); *C01B 2203/0861* (2013.01); *Y02E 60/364* (2013.01)

(58) Field of Classification Search
CPC ............ C01B 3/06; C25B 1/04; C07C 49/00; C07C 13/00; C07C 1/12
USPC ................ 204/157.15, 157.5, 157.52, 157.6; 568/303; 585/350
See application file for complete search history.

(56) References Cited

U.S. PATENT DOCUMENTS

| | | | | |
|---|---|---|---|---|
| 4,053,576 | A * | 10/1977 | Fletcher | 423/579 |
| 4,233,127 | A * | 11/1980 | Monahan | 204/157.5 |
| 4,330,307 | A * | 5/1982 | Coury | 62/618 |
| 4,342,738 | A * | 8/1982 | Burgund | 204/157.5 |
| 6,258,216 | B1 * | 7/2001 | Ohkawa | 204/156 |

OTHER PUBLICATIONS

Toyir et al., "Methanol Synthesis from CO2 and H2 over Gallium Promoted Copper-Based Supported Catalysts. Effects of Hydrocarbon Impurities in the CO2/H2 Source", Phys. Chem. Chem. Phys. (no month, 2001), vol. 3, pp. 4837-4842.*

Sayama et al., "Photocatalytic Decomposition of Water and Photocatalytic Reduction of Carbon Dioxide over ZrO2 Catalyst", J. of Phys. Chem. (no month, 1993), vol. 97, No. 3, pp. 531-533.*

* cited by examiner

*Primary Examiner* — Edna Wong
(74) *Attorney, Agent, or Firm* — Edward S. Wright

(57) ABSTRACT

Water molecules, preferably in the form of steam or water vapor, are introduced into a radiant energy transfer reactor. The radiant energy is absorbed by the molecules which dissociate into their constituent molecular elements of hydrogen and oxygen. To prevent recombining of the constituent molecular elements, the hydrogen and oxygen are separated from each other. Various devices may be employed to effect this separation. Once separated, the molecular components are prevented from recombining with each other or with other elements by using standard separation techniques normally employed for separating dissimilar gaseous species.

18 Claims, 2 Drawing Sheets

US 9,079,772 B2

RADIANT ENERGY DISSOCIATION OF MOLECULAR WATER INTO MOLECULAR HYDROGEN

RELATED APPLICATION DATA

The present application is a continuation-in-part of commonly owned, co-pending application Ser. No. 10/632,708, filed Aug. 1, 2003, now U.S. Pat. No. 7,384,619, which is incorporated herein by reference.

BACKGROUND OF THE INVENTION

It is well documented in the field of exploration and production of fossil fuels that worldwide oil reserves are finite and being rapidly depleted. Oil production in the United States reached a peak circa 1970 and is rapidly declining. Outside the United States, it is presently believed that peak oil production will reach a climax in approximately ten to fifteen years.

However, despite knowledge of the finiteness of the known reserves, demand for oil production and consumption continues to escalate due to increasing demands for energy within and outside the United States. Accordingly, despite any short-term price fluctuations in the commodity markets, it is expected that the price of oil will continue to escalate as known oil reserves become increasingly scarce. Eventually the price of oil will become too great to provide reasonably priced energy to fuel the global economy, thereby resulting in severe economic contraction of worldwide output of goods and services.

In addition to the increase in oil prices relating to the increasing scarcity of this commodity in view of increasing demand, the majority of known oil reserves are located in countries that are politically unstable. A government or cartel hostile to world economic growth could hold industrialized countries ransom to its oil by refusing to export its oil or charging ludicrously high prices. Sudden instability of oil production or price due to such hostilities is forecast and modeled to cause great economic rifts in our society. It is therefore important that we increase our reliance and resources on sources of energy that are readily available and renewable.

Other concerns regarding the use of fossil fuels are related to environmental factors. For example, the burning of fossil fuels produces carbon dioxide ($CO_2$) and smog producing compounds, such as unburned hydrocarbons and oxides of nitrogen, which are generally released into the atmosphere. It is known that increasing concentrations of $CO_2$ in the atmosphere have resulted in climatic changes, notably global warming. It is further been predicted that global warming may also eventually cause severe rifts in the global society through the loss of arable land needed to feed an ever-increasing global population. Furthermore, global warming is further causing melting of polar ice caps, thereby raising sea levels resulting in further loss of land for increasing populations.

One such source of energy that is readily abundant and renewable is hydrogen. On a weight basis, hydrogen possesses three times more energy than an equivalent weight of gasoline. There are several known methods of producing hydrogen, for example, coal gasification, partial oxidation of oil, steam methane reforming, and biomass gasification, among others. Although these methods have been shown to be efficacious in the generation of hydrogen, a significant disadvantage and limitation in each of these methods is the co-production of carbon dioxide, which as discussed above is a leading cause of global warming.

An alternative process technology that does not have carbon dioxide as a byproduct is the electrolysis of water. High purity hydrogen and oxygen can be produced using a relatively simple electrolysis method. However, a significant disadvantage and limitation of electrolysis is the high electrical power requirements needed to split water into constituent elements of hydrogen and oxygen. Many factors in the electrolysis method contribute to these power requirements.

For example, since water possesses a high dielectric constant, the resistance in the current path between the submersed electrodes is high. In addition, there is a mass transfer resistance at the electrodes due to the abrupt disruption of the electrolyte at the electrode surface from the evolution of gas. This disruption also increases the resistance to the flow of electrical energy.

Furthermore, the active surface area of the electrodes limits the electrolysis process. Accordingly, a need exists to overcome these inherent disadvantages and limitations of electrolysis to split water into its constituent elements of hydrogen and oxygen.

Water vapor discharges have been investigated by scientists for the purpose of understanding the reaction mechanisms of chemical reactions. The intermediates or free radicals that are formed during the reaction were the main subject of interest in the historic literature. Another interest in the pursuit of water decomposition was to find a process of generating hydrogen peroxide.

An early attempt (H. C. Urey and G. I. Levin, Journal of the American Chemical Society, 3290-3293, Vol. 51, November, 1929), at understanding the reactions in dissociated water by the Wood's tube was the discovery that water vapor under the influence of an electric discharge dissociated water into hydrogen atoms and hydroxyl free radicals. They noted that the product gas consisted of ⅔ the amount in hydrogen for the conditions that were run in the experiments. The paper does not illustrate any process conditions or the method of analysis of the gas mix. They also detected hydrogen peroxide in the water condensed in the trap. They attributed the excess hydrogen from the intermediate decomposition of the hydrogen peroxide product and not directly from the water vapor. They give support to this assertion by noting that past observations state that hydrogen peroxide is formed first and then further decomposed to simpler species. Experiments were conducted to determine the presence of hydrogen atoms and hydroxyl radicals, which was confirmed by the activity of the gas. They noted the products from the water vapor discharge were more active than if only hydrogen atoms were present. There was no conclusive proof of the existence of these species as cautioned by the Authors.

Another group of investigators (R. A. Jones, W. Chan and M. Venugoplan, The Journal of Physical Chemistry, volume 73, number 11 page 3693-3697, November 1969) were motivated to investigate the formation of hydrogen peroxide using a vacuum microwave discharge. They investigated a range of process conditions using water vapor as the reactant and trapping the products of dissociation in a cold trap at very low temperatures. They determined the yield of hydrogen peroxide under varying conditions.

P. J. Friel and K. A. Kreiger, Journal of the American Chemical Society, vol. 80, p. 4210-4215, 1958 investigated the recombination of the high voltage discharge products of water vapor. They used various surfaces in order to effect the recombination reactions and determine the final product composition. They principally focused on using the surface of silica gel to study recombination reactions. They discovered that silica gel did not catalyze the recombination of hydrogen atoms. They speculated that a surface was an active intermediate 1m the subsequent reactions. The recombination reaction was accompanied by a temperature increase and a green luminescence on the surface of the gel. It was noted that under these conditions the principal products of the reaction was H2 and O2. The reactions were conducted in a moderately high vacuum (<300 millitorr) and extremely low flow rates (<20 millimoles/hour). In addition, reactions of the water vapor discharge products in a liquid air trap were analyzed and studied. Hydrogen peroxide, water and hydrogen and oxygen were formed. The predominant product were water and hydrogen peroxide as well as hydrogen. Most further studies centered about optimizing the formation of hydrogen peroxide or studying the OH free radical.

On Jan. 28, 2003, George W. Bush, President of the United States of America, delivered to Congress the constitutionally mandated State of the Union address, available at whitehouse.gov/news/releases/2003/01/20030128-19.html. In this address, the President set forth a goal to promote energy independence for the country while dramatically improving the environment. Mr. Bush asserted in the address that "[I]n this century, the greatest environmental progress will come about . . . through technology and innovation"and implored Congress to "protect our environment in ways that generations before us could not have imagined."

In the same address, the President offered a proposal to Congress to authorize $1.2 billion in research funding to place the United States at the forefront of developing hydrogen powered automobiles in which hydrogen is reacted to oxygen to generate the energy to power the automobile, producing only water as a by product and not exhaust fumes. Mr. Bush recognized this innovation would "make our air significantly cleaner, and our country much less dependent on foreign sources of energy."

Subsequent to this address, it was reported in "Bush Hydrogen Initiative Fuels Debate,"cnn.com/2003/ALL-POLITICS02/07/hydrogen.vision.ap/, Friday, Feb. 7, 2003, that most of the major automobile companies doing business in the United States already have operational hydrogen powered fuel cell vehicle prototypes being road tested. In the cited report, the spokespersons for these companies express optimism that hydrogen powered fuel cell vehicles could be available to consumers within a decade, a timetable even more aggressive than the one proposed by the President. However, as reported in this article, this optimism is tempered by a cautionary note that "a hydrogen distribution system has not yet even begun to be developed."

Despite the expressed enthusiasm presented by the automobile manufacturers, the President's goal of developing hydrogen powered automobiles was nonetheless met by others with stinging criticism. To quote one such criticism, "[W]hat Bush didn't reveal in his nationwide address, however, is that his administration has been working quietly to ensure that the system used to produce hydrogen will be as fossil fuel—dependent—and potentially as dirty—as the one that fuels today's SUVs. According to the administration's National Hydrogen Energy Roadmap, drafted last year in concert with the energy industry, up to 90 percent of all hydrogen will be refined from oil, natural gas, and other fossil fuels—in a process using energy generated by burning oil, coal, and natural gas. The remaining 10 percent will be cracked from water using nuclear energy." See, 1 "Bush's Hydrogen Fuel Comes From Oil . . . ," Barry C. Lynn, Mother Jones, Mar. 6, 2003, published by Rogue Independent Media Center, rogue-imc.org/2003/06/808.shmtl.

The article, from which the quote set forth immediately above has been obtained, states that the administration's proposal to obtain hydrogen from fossil fuels would effectively eliminate the benefits offered by using hydrogen as a fuel for automobiles since the process of producing hydrogen from fossil fuels still would result in the release of carbon dioxide, the primary cause of global warming, into the atmosphere and continue this country's dependence on fossil fuels, most of which comes from imported oil. In this article criticism is also directed to the major oil companies seeking to protect their dominance in energy resources through lobbying efforts to affect administration policy and congressional legislation and through acquisitions of small research oriented companies seeking to produce hydrogen from renewable energy sources. Should the oil companies be successful in protecting their dominance, the article infers that even with a hydrogen economy, the country will remain dependent of foreign sources of oil for generations to come.

Although the cited article, along with its criticisms, makes inference that water is a preferred source for hydrogen, it further states that the known technologies for breaking water molecules into its constituents of hydrogen and oxygen in commercially usable quantities are extremely energy intensive, as in electrolysis in which an electric current between an cathode and an anode immersed in water ionizes the water molecules such that the hydrogen and oxygen ions respectively migrate to the anode and cathode. The article cites the preferred source for such energy as nuclear power plants, which the article states are also unacceptable due to the ecological impacts such plants are known to cause. Accordingly, the article postulates that only 10% of the total hydrogen will be produced form water.

Accordingly, it is seen that the prior art, even with all the criticisms targeted at such art, envisions fossil fuels, being a fuel source rich in carbon and hydrogen, as the primary source of hydrogen production in the foreseeable future without regard to the necessity of removing such carbon in the form of carbon dioxide. Without containment, the carbon dioxide will further contribute to global warming. The use of fossil fuels for a source of hydrogen will cause even greater demand on the known reserves, which are being rapidly depleted.

Therefore, with the known prior art, the President's stated goal of energy independence and an improved environment are not met. In fact, adopting the apparatus and processes of the known prior art would continue the country's dependence imported oil and further accelerate the rapid depletion of known reserves of oil and cause further environmental degradation.

More recently, California Governor Arnold Schwarzenegger, in the State of the State address delivered Jan. 7, 2004, called for the development of a "hydrogen highway." The hydrogen highway Schwarzenegger referred to in his speech is a highway of fueling stations located along major interstate highways, according to a state environmental protection agency official.

In yet another article that has been reported at story.news.yahoo.com/news?tmpl=story&cid=289&ncid=289&e=7&u=/ibsys/2004 0109/lo_kcra/1949844, environmental Secretary Terry Tamminen is the man behind Schwarzenegger's plan to make the hydrogen highway a reality. He says there is a good reason it doesn't exist already. "The energy companies don't want to make hydrogen fueling stations because there are no vehicles and the vehicle-makers don't want to produce vehicles because there are no fueling stations. So we are trying to break that chicken or egg cycle," he said.

It was the stated goal of the California governor to have, by the year 2010, nearly 200 hydrogen fueling stations up and running. Tamminen says it will take about $100 million in public and private dollars to help companies build them.

At the University of California at Davis, those who have been leading the world's research on hydrogen cars are glad to see the governor finally jump starting the mass-production process. UC Davis's Dan Sperling told the station, "It will be good for the company eventually, but it will be good for society. So, we need the government to provide some rewards." Prototype mechanics say once mass-produced, a hydrogen car's peppy performance will reward drivers, too.

SUMMARY OF THE INVENTION

Applicant's invention, as set forth in the above-identified application, meets the President's goal by furthering environmental progress through technology and innovation and also protects our environment in a novel way that generations before us could not have imagined. Applicant's invention further addresses the above stated concern of the automobile industry relating to the lack of a hydrogen fuel infrastructure in that Applicant's claimed processes are scalable allowing for the efficient production of hydrogen on a small local scale, such as in the home or vehicle, while large installations could produce quantities suitable for commercial distribution. Whereas current fossil fuel technologies rely upon an extensive global infrastructure from extracting the raw fuel, whether coal, oil or natural gas, from the ground, through refining, transporting and storing of the raw fuel, intermediaries and by-products up to the ultimate delivery of the final fuel product to consumers, the methods of the present invention do not rely on the construction of such far flung infrastructure but may be practiced at the point of use of the produced hydrogen. Accordingly, Applicant's invention also enables the goal of the California governor by allowing a hydrogen infrastructure to be developed that obviates the global infrastructure of fossil fuel delivery.

Applicant's invention also negates the above cited criticisms of extracting hydrogen from fossil fuels since Applicant's invention does not rely on fossil fuels as the source of hydrogen. Moreover, Applicant's invention may rely on renewable energy sources and wasted energy of conventional energy production as the source of energy to extract the hydrogen from molecular water.

It is taught, through Applicant's disclosure in the present application, that hydrogen can be extracted from water, the preferred source of hydrogen, using a novel process that is highly efficient and not as energy intensive as electrolysis. In fact Applicant's disclosure envisions renewable and recyclable resources as the source of energy to produce hydrogen for molecular water thereby ultimately removing dependency from fossil fuels altogether.

According to the present invention, molecular water, preferably in the form of high temperature steam or water vapor, is introduced into a radiant energy transfer chamber. The radiant energy is of sufficient energy to excite the water molecules thereby causing the dissociation thereof into the constituent molecular elements of hydrogen and oxygen. To prevent recombining of the constituent molecular elements, the hydrogen and oxygen are separated from each other. Various methods may be employed to effect this separation. Once separated, the molecular components are prevented from recombining with each other or with other elements by using standard separation techniques normally employed for separating dissimilar gaseous species.

These and other objects, advantages and features of Applicant's invention will become readily apparent from a study of the following Description of the Exemplary Preferred Embodiments when read in conjunction with the attached drawing and appended claims.

DESCRIPTION OF THE INVENTION

The above referenced application, incorporated herein by reference, discloses several variations of radiant energy transfer reactors that may be used to practice the present invention. It is to be initially understood that the construction of any such reactor is not to be limited to the specific examples shown therein, but that any reactor that transfers energy to molecular water, as described in greater detail hereinbelow, is contemplated by the scope of the present invention. Accordingly, the following description is not to be deemed limited to the exemplary reactor herein described.

Figure 1:
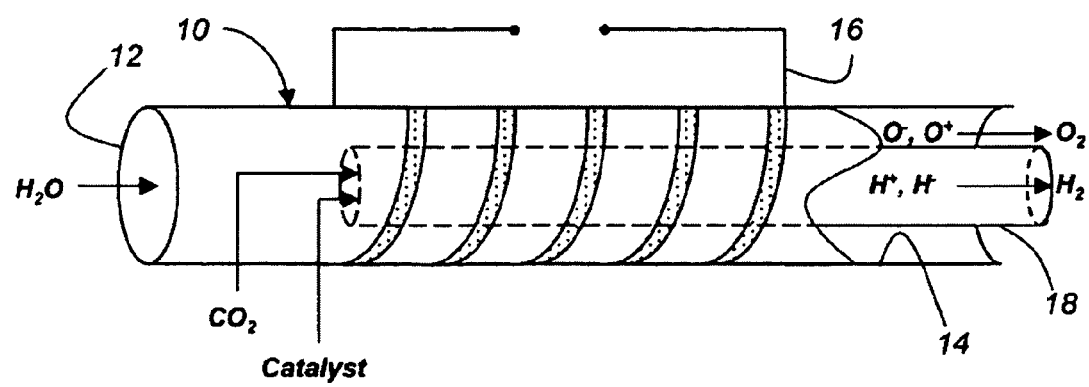
FIG. 1 is a perspective view, partially broken, of a radiant energy transfer apparatus useful to practice the present invention.

With reference to FIG. 1, there is shown a radiant energy transfer reactor 10. The reactor 10 includes a first portion 12 adapted to receive water molecules, a second portion 14 at which the constituent components of the dissociated water molecules may be further separated and removed, a coil 16 to which electrical energy is applied to develop an electromagnetic field within the reactor 10 generally defining a reaction zone intermediate the first portion 12 and the second portion 14 of the reactor 10.

It is to be understood that the structure required to develop the electromagnetic field need not be limited to the coil 16 as seen in FIG. 1. Any structure that is capable of developing an electromagnetic field in the reaction zone of the reactor 10 is contemplated to be an equivalent structure. For example, in the above referenced co-pending application, various structures are disclosed that are useful to induce the electromagnetic field in the reaction zone of the reactor 10. For example, instead of the coil 16 as shown herein, the electromagnetic filed within the reaction zone of the reactor 10 can be developed by applying electrical energy across radially opposed field plates, axially spaced field rings, or by a waveguide, among others, all as shown in the above referenced application.

It is known that molecules absorb energy throughout the entire electromagnetic spectrum. Furthermore, the energy can be differentiated according to the mode of absorption. For example, the absorbed energy may increase or decrease any of three kinetic modes of motion of the molecule, these modes being rotational, vibrational and translational motion. Each kinetic mode may further be associated with specific wavelengths or frequencies of the absorbed radiation, such that the rotational, vibrational and translational energies of the molecule will have its own characteristic wavelength or frequency. Furthermore, at the point of dissociation of the molecular bond, the corresponding energy will have a characteristic frequency or wavelength for each of these kinetic modes.

In addition to absorption to excite any or all of the three kinetic modes set forth immediately above, electromagnetic energy at selected wavelengths may also be absorbed to excite the electronic mode of the molecule. Excitation of the electronic mode causes electrons in one orbital of the molecular bond to be excited into a higher energy orbital. With sufficient energy absorption, the molecular bond will be overcome thereby allowing dissociation of the molecule into its constituent parts.

Water molecules, in particular, absorb greater amounts of electromagnetic energy having wavelengths in the ultraviolet, infrared, microwave or radio frequency spectrum. The OH bond of the water molecule has a characteristic frequency or wavelength based on the kinetic or electronic modes described above. Accordingly, at specific wavelengths or frequencies within this spectrum the OH bond will dissociate, in any one or combination of the kinetic and electronic modes, provided that the energy of the electromagnetic energy at the frequency of dissociation is sufficient to overcome the energy of such bond. For example, one such frequency will excite the translational mode of the water molecule, and with sufficient energy, cause the molecule to dissociate. Other frequencies will of course excite the other modes.

The dissociation of the OH bond will result in the formation of hydrogen (H) and oxygen (O) species. It is necessary that these species be separated so that they do not recombine with each other to return to molecular water, but combine with their own species such that hydrogen gas ($H_2$) and oxygen gas ($O_2$) result.

The above referenced application also discloses several types of apparatus and techniques to effect this separation. Accordingly, the following description is not to be deemed limited to the exemplary separation herein described. Accordingly, any of various forms of membranes, converging-diverging nozzles, electromagnetic field or rotational plasma centrifugation may be used.

For example, the apparatus of FIG. 1 includes a membrane 18 within the reaction zone intermediate the first portion 12 and the second portion 14 of the reactor 10. As described in the above referenced application, the membrane has porosity such that it is permeable to the hydrogen species but contains the oxygen species of the dissociated water molecules.

Preferably, the water molecules introduced into the reactor 10 are in the form of high temperature steam, such that energy input into the reactor 10 can be primarily utilized for the absorption at the specified frequency for dissociation. In this regard, various sources of high temperature steam can be used such that energy used for dissociation is not consumed to develop the steam.

For example, as described in the above reference application, geothermal steam may be used both as a source of the water molecules for the reactor 10, and for developing, using a conventional steam turbine and generator, some or all of the electrical energy to develop the primary electrical energy to be converted to the high frequency energy for application to the coil 16. Additionally, steam for such purposes can be developed using naturally occurring hot dry rocks and abandoned oil and gas wells, such that water introduced into these systems exists as high temperature steam. Furthermore, solar and wind sources can also be used to provide the energy for the reactor 10 and for developing the high temperature steam.

Also as described in the above referenced application, coal, oil, natural gas and nuclear fueled power plants can also provide the primary electrical energy for the reactor 10 with the waste steam from the steam turbines and cooling towers being used as the source of water molecules for the reactor 10. Accordingly, it is seen that the present invention may supplement the use of fossil fuels and obviate their use in accordance with specific applications. Also, the hydrogen production can be fixed to existing locations of power plants and distributed sites where a source of hydrogen is needed.

As described above, the electromagnetic field developed within the reaction zone of the reactor 10 remains the primary source to effect dissociation of the molecular water. It is contemplated by the present invention that other sources of energy for dissociation may be used in addition thereto to enhance overall efficiency of the dissociation process.

For example, as the hydrogen species exits the reaction zone from within the membrane 18, it recombines into hydrogen gas, or $H_2$. When this recombination occurs, electromagnetic energy in the ultraviolet spectrum is emitted. Since water molecules are absorptive of this energy, such emitted energy may be "piped" back to the incoming stream of super heated steam to assist in the dissociation. For example, the membrane 18 may be constructed of a material transparent to ultraviolet electromagnetic energy to illuminate the incoming molecular water molecules.

In addition, the emitted ultraviolet energy can also be used to illuminate high mass elements, such as metals and inert gasses, seeded into the incoming stream of molecular water to cause photon emission from such high mass elements. The photons are then absorbed by the molecular water to excite one of the modes described above to assist with dissociation.

Figure 2:
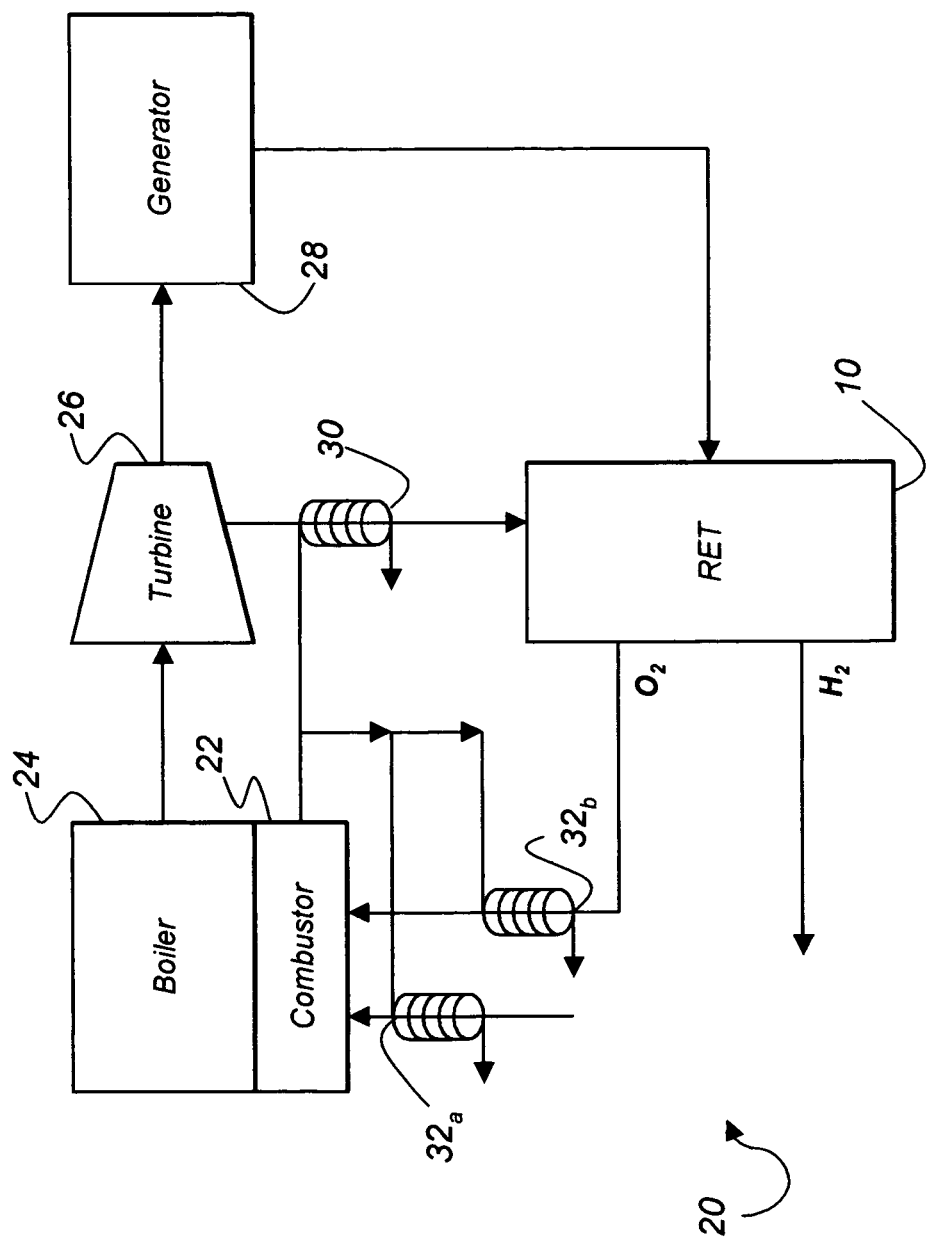
FIG. 2 is a block diagram of a radiant energy transfer system constructed according to the principles of the present invention.

With reference to FIG. 2, there is shown a system 20 useful to describe the use of the reactor 10 in conjunction with waste reprocessing to develop energy and steam for the reactor 10. The system 20 includes a combustor 22 in which waste products are ignited and combusted with air being provided into the combustor 22. The waste products can be any type of combustible waste. The heat of combustion is transferred to a boiler 24 to develop the high temperature steam.

A steam turbine 26 is powered by the steam from boiler 24 and a generator 28 is in turn powered by the steam turbine 26. The generator develops the electrical energy applied to the reactor 10. The electrical energy is used to develop the high frequency electromagnetic field within the reactor 10 as hereinabove described. Additionally, the excess steam from the steam turbine 26 is furnished to the reactor 10 to provide a source of water molecules to be dissociated.

As described above, the reactor 10 provides a stream of oxygen and hydrogen gas. The hydrogen gas may be pumped into storage tanks for use elsewhere or used for powering fuel cells or combusted for other equipment proximate to the system 20. The stream of oxygen gas may in turn be introduced into the combustor 22 to provide an oxygen rich atmosphere to enhance the combustion of the waste products, especially of plastics. The Joule-Thomson effect may also be used to cool the hydrogen gas with the heat given off re-introduced to preheat the steam provided to the reactor 10 from the turbine 26.

Also as the hydrogen species is pumped from the reaction zone to recombine into hydrogen gas, additional exothermic energy may be recaptured to be re-introduced as process heat to preheat the steam entering the reactor 10. As the hydrogen species recombines into gaseous hydrogen, or $H_2$, the protons of each atom in the $H_2$ molecule have an associated spin. When the spin is in the same direction, ortho-hydrogen is formed and is slightly magnetic. When the spin of each atom in the $H_2$ molecule is in opposite directions, para-hydrogen is formed.

At 20° C. (68° F.) and atmospheric pressure, hydrogen gas is approximately 25% para-hydrogen and 75% ortho-hydrogen. When liquefied, 99% of the ortho-hydrogen is converted to para-hydrogen. This conversion results in exothermic heat emission of approximately 707 kJ/kg. This heat may be reused as process heat as described above.

It is also contemplated that flue gases from the combustor 22 can be used to preheat the steam provided to the reactor 10 from the steam turbine 26. For example the flue gases could be passed through a heat exchanger, diagrammatically represented at 30 thermally coupled to conventional apparatus used to transfer the steam from the turbine 26 to the reactor 10. Similarly, the flue gas can be used to preheat the incoming air or oxygen stream, or both, into the combustor 22, by passing the flue gas through either or both of heat exchangers, diagrammatically represented at 32a, 32b.

The burning of carbon rich waste products in the combustor 22 will produce waste carbon dioxide ($CO_2$) as a by-product within the flue gases. To avoid releasing the carbon dioxide into the atmosphere or providing additional storage therefor, the $CO_2$ can be used instead to combust with a portion of the output hydrogen gas stream from the reactor 10 such that useful organic compounds are also produced. Such organic compounds may include alcohols, alkylides, ketones and hydrocarbons.

For example, with reference returning to FIG. 1, the $CO_2$ combustion product may be injected interiorly into the membrane 18, which forms an inner concentric tube within the reactor 10 to intersect with the hydrogen rich stream therein. Furthermore, a catalyst may also be injected into the inner concentric tube formed by the membrane 18 to promote the reaction between the hydrogen species and the $CO_2$, as generally seen in FIG. 1. For example, nickel based catalysts may be injected to promote the production of methane, whereas a catalyst, such as Cu or Zn, is useful to promote the production of methanol.

It is to be understood that the present invention is not to be limited to any catalyst specifically disclosed herein as other well know catalyst are known to assist in the combustion of $CO_2$ and the hydrogen species to form useful organic compounds. For example, one such catalyst, $Co—ZrO_2—MgO$, is known to be active in the reduction of $CO_2$ by $H_2$ to methane.

The point of injection, diagrammatically shown in FIG. 1, of the $CO_2$ into the inner concentric tube formed by the membrane 18 may occur into the reaction zone or at a point immediately upstream or downstream from the reaction zone. The selected catalyst may also be injected into the reaction zone or immediately downstream therefrom. The distribution of the organic compound products obtained from the reduction of the $CO_2$ by the hydrogen species will differ depending upon the point of catalyst injection.

In addition thereto, a separate catalytic reactor (not shown) downstream from the reactor 10 may also be used. Since the reaction of $CO_2$ and the hydrogen species is exothermic, the excess heat generated in such catalytic reactor may be used to preheat the enriched air supplied to the combustor 22, the steam supplied from the turbine 26 to the reactor 10, or applied to the boiler 24 itself by any conventional heat exchange apparatus.

It should be apparent to those skilled in the art that the system 20 as described above may also be used with the geothermal and other sources of steam described above and in the reference application. In such case, the combustor 22 and boiler 24 are not needed as the steam is otherwise provided for the steam turbine 26. Furthermore, when using existing power plants, the apparatus, whether gas, oil or nuclear fueled, to produce steam to drive the power generators, may be used in lieu of the combustor 22 and boiler 24.

Figure 3:
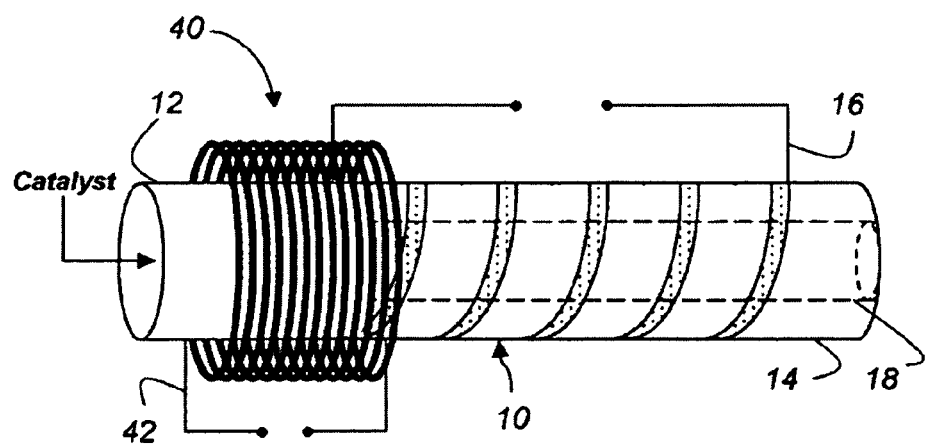
FIG. 3 is a block diagram of a magneto hydrodynamic system useful to replace the turbine and generator of FIG. 2.

With reference to FIG. 3, a magneto hydrodynamic system 40 may also be used to replace the turbine 26 and generator 28 (FIG. 2) in certain applications. A varying magnetic field about the high temperature steam into the reactor 10 or the reaction zone within the reactor 10 may be developed by any conventional means. The flow of ions within the magnetic field will, as is well known, develop an electric current within a coil 42. This current may then be used to provide all or part of the electrical power to the reactor 10. Additionally, an alkaline metal, such as Cesium (Cs) or Potassium (K) may be introduced into the high temperature steam to enhance ionization.

There has been described hereinabove novel apparatus and methods for developing hydrogen gas. Those skilled in the art may now make numerous uses of and departures from the above identified embodiments without departing from the inventive concepts disclosed herein. Accordingly, the present invention is to be defined solely by the scope of the appended claims.

What is claimed as the invention is:

1. A method of generating hydrogen and oxygen gas, comprising the steps of: introducing water molecules in the form of high temperature water vapor or steam into a radiant energy transfer reactor; applying electrical energy to the reactor to produce an electromagnetic field having a frequency spectrum that only stimulates one or more of the kinetic and electronic modes of the water molecules and an energy level commensurate with a molecular bonding energy of the water molecules to dissociate the water molecules into hydrogen and oxygen species without the use of any energy other than the applied electrical energy while the water molecules are being excited in the electromagnetic field; separating the dissociated hydrogen and oxygen species within the electromagnetic field; and removing the separated species from the electromagnetic field in a manner such that like species recombine to form hydrogen and oxygen gas.

2. The method of claim 1 wherein the electromagnetic field excites a translational mode of the water molecules.

3. The method of claim 1 wherein the electromagnetic field excites a vibrational mode of the water molecules.

4. The method of claim 1 wherein the electromagnetic field excites a rotational mode of the water molecules.

5. The method of claim 1 wherein the electromagnetic field excites an electronic mode of the water molecules.

6. The method of claim 1 wherein the hydrogen and oxygen species are separated by passing the hydrogen species through a membrane having a porosity which is permeable to the dissociated hydrogen species and impervious to the oxygen species.

7. The method of claim 1 wherein the dissociated hydrogen and oxygen species are separated in a time variant electromagnetic field that causes the species to rotate and separate by centrifugation.

8. The method of claim 1 wherein the frequency of the electromagnetic field is selected to stimulate the water molecules in a mode selected from the group consisting of a translational mode, a vibrational mode, a rotational mode, and the electronic mode.

9. The method of claim 1 wherein the electromagnetic field stimulates the water molecules in a translational mode, a vibrational mode, a rotational mode, and an electronic mode.

10. The method of claim 1 including a step selected from the group consisting of injecting carbon dioxide into the water molecules prior to exciting the molecules in the electromagnetic field, injecting carbon dioxide into the hydrogen species in the electromagnetic field, and injecting carbon dioxide into the hydrogen species and/or hydrogen gas after the dissociated species have been separated.

11. The method of claim 1 further including the steps of injecting carbon dioxide into the water molecules prior to exciting the molecules in the electromagnetic field, injecting carbon dioxide into the hydrogen species in the electromagnetic field, and injecting carbon dioxide into the hydrogen species and/or hydrogen gas after the dissociated species have been separated.

12. The method of claim 1 wherein the water molecules are obtained from geothermal steam.

13. A method of generating hydrogen and oxygen gas, comprising the steps of: introducing water molecules in the form of high temperature water vapor or steam into a radiant energy transfer reactor, applying electrical energy to the reactor to produce an electromagnetic field having a frequency spectrum that only stimulates one or more of the kinetic and electronic modes of the water molecules and an energy level commensurate with a molecular bonding energy of the water molecules to dissociate the water molecules into hydrogen and oxygen species without the use of any energy other than the applied electrical energy, separating the dissociated hydrogen and oxygen species within the electromagnetic field, removing the separated species from the electromagnetic field in a manner such that like species recombine to form hydrogen and oxygen gas, and reducing the hydrogen species and/or hydrogen gas with carbon dioxide to form organic compounds.

14. The method of claim 13 wherein carbon dioxide is injected into the water molecules prior to exciting the molecules in the electromagnetic field.

15. The method of claim 13 wherein carbon dioxide is injected into the hydrogen species in the electromagnetic field.

16. The method of claim 13 wherein carbon dioxide is injected into the hydrogen species and/or hydrogen gas after the dissociated species have been separated.

17. The method of claim 13 including the step of seeding the reduction of the hydrogen species and/or hydrogen gas with a catalyst selected to promote formation of a preselected one of the organic compounds.

18. The method of claim 17 wherein the catalyst is injected at a point selected in accordance with a distribution of the organic compounds to be formed.

* * * * *